United States Patent
Iguchi et al.

(10) Patent No.: US 11,611,105 B2
(45) Date of Patent: Mar. 21, 2023

(54) ELECTROLYTE SOLUTION AND LITHIUM-ION BATTERY

(71) Applicant: TOYOTA JIDOSHA KABUSHIKI KAISHA, Toyota (JP)

(72) Inventors: Hiroki Iguchi, Nagoya (JP); Hideki Sano, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 548 days.

(21) Appl. No.: 16/364,795

(22) Filed: Mar. 26, 2019

(65) Prior Publication Data

US 2019/0305373 A1 Oct. 3, 2019

(30) Foreign Application Priority Data

Mar. 27, 2018 (JP) .............................. JP2018-059873

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01)

(58) Field of Classification Search
CPC ......... H01M 10/0567; H01M 10/0525; H01M 10/0568; H01M 10/0569
See application file for complete search history.

(56) References Cited

U.S. PATENT DOCUMENTS

| | | | |
|---|---|---|---|
| 2012/0028167 A1* | 2/2012 | Wang | H01M 8/106 429/494 |
| 2017/0162910 A1* | 6/2017 | Katou | H01M 10/0567 |
| 2017/0256819 A1* | 9/2017 | Kondo | H01M 10/0569 |
| 2017/0352920 A1* | 12/2017 | Kawai | H01M 4/661 |

FOREIGN PATENT DOCUMENTS

| | | |
|---|---|---|
| CN | 107078354 A | 8/2017 |
| JP | 01-132067 A | 5/1989 |
| JP | 2015185401 A * | 10/2015 |

OTHER PUBLICATIONS

JP-2015185401-A translation (Year: 2015).*

* cited by examiner

*Primary Examiner* — Ula C Ruddock
*Assistant Examiner* — Amanda Rosenbaum
(74) *Attorney, Agent, or Firm* — Sughrue Mion, PLLC

(57) ABSTRACT

An electrolyte solution for a lithium-ion battery is provided. The electrolyte solution contains at least a solvent and a lithium salt. The lithium salt is dissolved in the solvent. The solvent contains acetic anhydride at a concentration not lower than 80 vol %.

5 Claims, 6 Drawing Sheets

ELECTROLYTE SOLUTION AND LITHIUM-ION BATTERY

This nonprovisional application claims priority to Japanese Patent Application No. 2018-059873 filed on Mar. 27, 2018, with the Japan Patent Office, the entire contents of which are hereby incorporated by reference.

BACKGROUND

Field

The present disclosure relates to an electrolyte solution and a lithium-ion battery.

Description of the Background Art

Japanese Patent Laying-Open No. 01-132067 describes that a mixed solvent of acetic anhydride and another solvent is used as a solvent and the mixing ratio of acetic anhydride to that another solvent is "(acetic anhydride):(another solvent)=1:10 to 30:10 (molar ratio)".

SUMMARY

There has been a demand for improvement in electrical conductivity of electrolyte solutions. An electrolyte solution contains a solvent and a lithium (Li) salt. As the solvent, a mixed solvent of ethylene carbonate (EC), dimethyl carbonate (DMC), and ethyl methyl carbonate (EMC), that is a carbonate-based mixed solvent, is extensively used in conventional settings.

The reason for the extensive use of carbonate-based mixed solvents may be because by using only one type of solvent instead, it is difficult to obtain both a high dissociative capacity and a low viscosity. EC, for example, has a high dissociative capacity but also has a high viscosity. Each of DMC and EMC, for example, has a low viscosity but also has a low dissociative capacity. As the Li salt, $LiPF_6$ is typically used. The reason may be the high solubility of $LiPF_6$ in a carbonate-based mixed solvent.

The electrical conductivity of an electrolyte solution depends primarily on the solvent composition as well as the type and the concentration of the Li salt. The upper limit to the electrical conductivity may be about 10.9 mS/cm when a carbonate-based mixed solvent and $LiPF_6$ are used together.

As a candidate for the solvent, acetic anhydride has been researched (see Japanese Patent Laying-Open No. 01-132067, for example). However, no sufficient investigation may have been conducted on electrical conductivity.

An object of the present disclosure is to provide an electrolyte solution that may have a high electrical conductivity.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] An electrolyte solution according to the present disclosure is an electrolyte solution for a lithium-ion battery. The electrolyte solution contains at least a solvent and a lithium salt. The lithium salt is dissolved in the solvent. The solvent contains acetic anhydride at a concentration not lower than 80 vol %.

As found by the present disclosure, acetic anhydride may have a well-balanced combination of dissociative capacity and viscosity; more specifically, acetic anhydride has a moderately high dissociative capacity and a moderately low viscosity. In the electrolyte solution according to the present disclosure, the solvent contains acetic anhydride at a concentration not lower than 80 vol % (80% by volume). This concentration may provide the electrolyte solution with a high electrical conductivity. It should be noted that Japanese Patent Laying-Open No. 01-132067 does not describe an electrolyte solution in which the solvent contains acetic anhydride at a concentration not lower than 80 vol %.

[2] The solvent may contain acetic anhydride at a concentration not lower than 90 vol %.

As for the electrolyte solution according to the present disclosure, it is expected that the higher the ratio of acetic anhydride to the solvent is, the higher the electrical conductivity is. Acetic anhydride may have a well-balanced combination of dissociative capacity and viscosity. Therefore, adding EC and/or DMC to acetic anhydride can disrupt the good balance between the dissociative capacity and the viscosity. However, adding an additional component (solvent) to acetic anhydride is tolerated as long as an improved electrical conductivity compared to the electrical conductivity of conventional electrolyte solutions (electrolyte solutions that contain a carbonate-based mixed solvent as the solvent) can be obtained.

[3] At least part of the lithium salt may be lithium bis(fluorosulfonyl)imide.

Acetic anhydride has not been widely used as the solvent, and one of the reasons may be because a typical Li salt (namely, $LiPF_6$) is poorly soluble in acetic anhydride. Lithium bis(fluorosulfonyl)imide (LiFSI), on the other hand, is highly soluble in acetic anhydride. Therefore, if the Li salt contains LiFSI, the amount of the Li salt soluble in the solvent may increase and as a result, an improved electrical conductivity is expected to be obtained.

[4] In the electrolyte solution according to [3] above, the lithium salt may be dissolved in the solvent at a concentration not lower than 0.9 mol/L and not higher than the saturation concentration.

As mentioned above, $LiPF_6$ is poorly soluble in acetic anhydride. When acetic anhydride is used as sole solvent, the saturation concentration of $LiPF_6$ in acetic anhydride may be about 0.8 mol/L. When the Li salt contains LiFSI, on the other hand, the saturation concentration of the Li salt may reach 0.9 mol/L or higher and as a result, an improved electrical conductivity is expected to be obtained.

[5] The following configuration may be adopted: the solvent contains acetic anhydride at a concentration not lower than 90 vol %; the lithium salt is dissolved in the solvent at a concentration not lower than 1.1 mol/L and not higher than 2.0 mol/L; and at least part of the lithium salt is lithium bis(fluorosulfonyl)imide.

In the configuration according to [5] above with all these conditions being satisfied, an improved electrical conductivity is expected to be obtained.

[6] A lithium-ion battery according to the present disclosure includes at least the electrolyte solution according to any one of [1] to [5] above.

It is expected that the lithium-ion battery according to the present disclosure has a low battery resistance. The reason may be that the electrolyte solution according to the present disclosure may have a high electrical conductivity.

The foregoing and other objects, features, aspects and advantages of the present disclosure will become more

DESCRIPTION OF THE PREFERRED EMBODIMENTS

Figure 1:
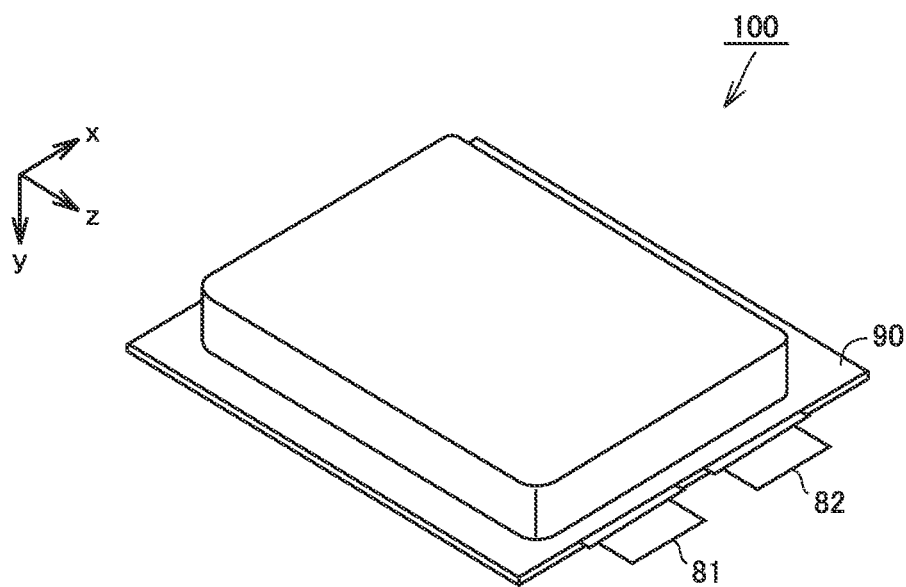
FIG. 1 is a first schematic view illustrating the structure of the lithium-ion battery according to the present embodiment.

In the following, embodiments according to the present disclosure (herein called "present embodiment") are described. The scope of claims is not limited to the description below.

<Electrolyte Solution>

An electrolyte solution according to the present embodiment is an electrolyte solution for a lithium-ion battery. The lithium-ion battery is described below in detail. The electrolyte solution contains at least a solvent and a Li salt.

It is expected that the electrolyte solution according to the present embodiment has a high electrical conductivity. The electrical conductivity of the electrolyte solution may be not lower than 13.5 mS/cm, for example. The electrical conductivity of the electrolyte solution may be not lower than 14.8 mS/cm, for example. The electrical conductivity of the electrolyte solution may be not lower than 16.0 mS/cm, for example. The electrical conductivity of the electrolyte solution may be not lower than 17.2 mS/cm, for example. The electrical conductivity of the electrolyte solution may be not lower than 18.1 mS/cm, for example. The electrical conductivity of the electrolyte solution may be not lower than 19.1 mS/cm, for example. The upper limit to the electrical conductivity is not particularly limited. The electrical conductivity of the electrolyte solution may be not higher than 20.0 mS/cm, for example.

The electrical conductivity according to the present embodiment is measured at 25° C. The electrical conductivity is measured with a typical conductivity meter. The conductivity meter may also be called electrical conductivity meter or electric conductivity meter, for example. A conductivity meter (trade name, CM-31P) manufactured by DKK-TOA Corporation may be used, for example. A conductivity meter equivalent to CM-31P may also be used. Measurement of the electrical conductivity is carried out at least three times. The arithmetic mean of these at least three measurements is used.

<<Solvent>>

The solvent is a liquid component in which the Li salt dissolves. The solvent is aprotic. In the present embodiment, the solvent contains acetic anhydride at a concentration not lower than 80 vol %. The composition of the solvent may be identified by a conventionally known method. Analysis of the composition of the solvent may be carried out by nuclear magnetic resonance (NMR) or gas chromatography-mass spectrometry (GC-MS), for example. Analysis of the composition of the solvent is carried out at least three times. The arithmetic mean of these at least three results is used.

In the configuration in which the solvent contains acetic anhydride at a concentration not lower than 80 vol %, the electrolyte solution may have a high electrical conductivity. The reason may be because acetic anhydride has a moderately high dissociative capacity and a moderately low viscosity. In the present embodiment, the higher the ratio of acetic anhydride to the solvent is, the higher the electrical conductivity is expected to be. Therefore, the solvent may contain acetic anhydride at a concentration not lower than 90 vol %. The solvent may consist essentially of acetic anhydride. In other words, the solvent may contain substantially 100 vol % acetic anhydride.

<<Additional Component>>

As long as the solvent contains acetic anhydride at a concentration not lower than 80 vol %, the solvent may further contain an additional component (a solvent other than acetic anhydride). Examples of the additional component include a cyclic carbonate, a chain carbonate, a lactone, a cyclic ether, a chain ether, and a carboxylic acid ester. The solvent may contain only one type of the additional component. In other words, the solvent may adopt a two-component system. The solvent may contain two or more types of the additional component. In other words, the solvent may adopt a three-component system or a four-component system, for example.

The cyclic carbonate may be EC, propylene carbonate (PC), butylene carbonate (BC), and/or fluoroethylene carbonate (FEC), for example. The chain carbonate may be DMC, EMC, and/or diethyl carbonate (DEC), for example.

The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

For example, the solvent may contain acetic anhydride at a concentration not lower than 80 vol % and lower than 100 vol % with the remainder being made up of the additional component (such as a cyclic carbonate and/or a chain carbonate). For example, the solvent may contain acetic anhydride at a concentration not lower than 90 vol % and lower than 100 vol % with the remainder being made up of the additional component.

<<Lithium Salt>>

The Li salt is a supporting electrolyte. The Li salt is dissolved in the solvent. In other words, the concentration of the Li salt (hereinafter, also called "salt concentration") is not higher than the saturation concentration. The electrolyte solution may contain only one type of the Li salt. The electrolyte solution may contain two or more types of the Li salt. In the configuration in which the electrolyte solution contains two or more types of the Li salt, the salt concentration refers to the total concentration of all the Li salts contained. The salt concentration may be measured by a conventionally known method. The salt concentration may be measured by NMR spectrometry, for example. Measurement of the salt concentration is carried out at least three times. The arithmetic mean of these at least three measurements is used.

The higher the salt concentration is, the greater the absolute number of Li ions may be. However, the higher the salt concentration is, the lower the degree of dissociation of the Li salt tends to be. Therefore, it is desirable that the adjustment of the salt concentration for achieving the maximum electrical conductivity be conducted without the salt concentration exceeding the saturation concentration.

The Li salt may be LiFSI [LiN(FSO$_2$)$_2$], LiPF$_6$, LiBF$_4$, LiClO$_4$, LiAsF$_6$, LiSbF$_6$, LiCF$_3$SO$_3$, LiC$_4$F$_9$SO$_3$, and/or LiC(CF$_3$SO$_2$)$_3$, for example.

At least part of the Li salt may be LiPF$_6$. The entire Li salt may be LiPF$_6$. It should be noted, however, that the saturation concentration of LiPF$_6$ in acetic anhydride may be about 0.8 mol/L.

At least part of the Li salt may be LiFSI. LiFSI is highly soluble in acetic anhydride. In the configuration in which at least part of the Li salt is LiFSI, the Li salt may be dissolved in the solvent at concentration not lower than 0.9 mol/L and not higher than the saturation concentration. As a result, an improved electrical conductivity is expected to be obtained. Part of the Li salt may be LiFSI. The entire Li salt may be LiFSI.

The Li salt that contains LiFSI may further contain LiPF$_6$ as an optional component. In this configuration, when the ratio (in concentration) of LiFSI to LiPF$_6$ satisfies the relationship "LiFSI:LiPF$_6$=10:0 to 2:8", the saturation concentration of the entire Li salt is high and thereby an improved electrical conductivity is expected to be obtained. The ratio (in concentration) of LiFSI to LiPF$_6$ may satisfy the relationship "LiFSI:LiPF$_6$=10:0 to 5:5", and also in this case, an improved electrical conductivity is expected to be obtained.

The following configuration may be adopted: the solvent contains acetic anhydride at a concentration not lower than 90 vol %; the solvent contains the Li salt dissolved therein at a concentration not lower than 1.1 mol/L and not higher than 2.0 mol/L; and at least part of the Li salt is LiFSI. In the configuration in which all these conditions are satisfied, an improved electrical conductivity is expected to be obtained.

The following configuration may be adopted: the solvent contains substantially 100 vol % acetic anhydride; and LiFSI is dissolved in the solvent at a concentration not lower than 1.1 mol/L and not higher than 2.0 mol/L. In the configuration in which both conditions are satisfied, an improved electrical conductivity is expected to be obtained.

The following configuration may be adopted: the solvent contains acetic anhydride at a concentration not lower than 80 vol %; the solvent contains the Li salt dissolved therein at a concentration not lower than 1.1 mol/L and not higher than 2.0 mol/L; and the Li salt contains LiFSI and LiPF$_6$. In the configuration in which all these conditions are satisfied, an improved electrical conductivity is expected to be obtained.

The following configuration may be adopted: the solvent contains acetic anhydride at a concentration not lower than 90 vol %; the Li salt is dissolved in the solvent at a concentration not lower than 1.1 mol/L and not higher than 1.5 mol/L; and the Li salt contains LiFSI and LiPF$_6$. In the configuration in which all these conditions are satisfied, an improved electrical conductivity is expected to be obtained.

<<Additives>>

As long as the electrolyte solution contains the solvent and the Li salt, the electrolyte solution may further contain various additives. The concentration of the additives may be not lower than 0.005 mol/L and not higher than 0.5 mol/L, for example. Examples of the additives include a solid electrolyte interface (SEI) film-forming agent, a gas generation agent, and a flame retardant. The electrolyte solution may contain only one type of the additives. The electrolyte solution may contain two or more types of the additives. In the configuration in which the electrolyte solution contains two or more types of the additives, the concentration of the additives refers to the total concentration of all the additives contained.

The SEI-film-forming agent is a component that promotes SEI formation on a surface of, for example, a negative electrode active material. The SEI-film-forming agent may be vinylene carbonate (VC), vinylethylene carbonate (VEC), LiB(C$_2$O$_4$)$_2$, LiBF$_2$(C$_2$O$_4$), LiPF$_2$(C$_2$O$_4$)$_2$, propane sultone (PS), and/or ethylene sulfite (ES), for example.

The gas generation agent is also called anti-overcharging additive. The gas generation agent is a component that generates gas at the time of overcharging and thereby potentially promotes the activation of, for example, a current interrupt device (CID), which is activated upon pressure application. The gas generation agent may be cyclohexylbenzene (CHB) and/or biphenyl (BP), for example.

The flame retardant is a component that gives flame retardancy to the electrolyte solution. The flame retardant may be a phosphoric acid ester and/or a phosphazene compound, for example.

<Lithium-Ion Battery>

Next, the lithium-ion battery according to the present embodiment is described. The lithium-ion battery according to the present embodiment may be a secondary battery. The lithium-ion battery according to the present embodiment may be a primary battery. Hereinafter, a lithium-ion battery may be simply referred to as "battery".

FIG. 1 is a first schematic view illustrating the structure of the lithium-ion battery according to the present embodiment.

A battery 100 includes a casing 90. Casing 90 is a pouch made of an aluminum-laminated film. In other words, battery 100 is a laminate-type battery. Alternatively, casing 90 may be made of metal and/or the like. Battery 100 may be a prismatic battery or a cylindrical battery, for example. Casing 90 may be equipped with a CID, a gas-discharge valve, and a liquid inlet, for example. Casing 90 is hermetically sealed. A positive electrode tab 81 and a negative electrode tab 82 are provided to allow for communication between inside and outside casing 90.

Figure 2:
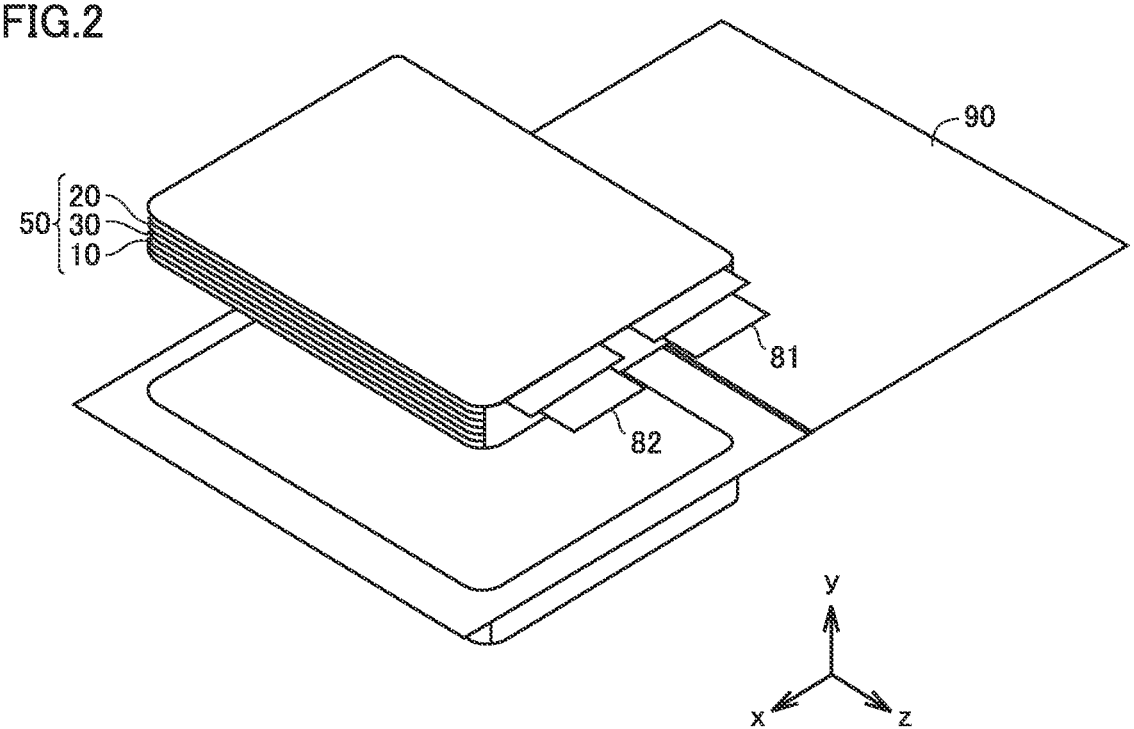
FIG. 2 is a second schematic view illustrating the structure of the lithium-ion battery according to the present embodiment.

FIG. 2 is a second schematic view illustrating the structure of the lithium-ion battery according to the present embodiment.

Casing 90 accommodates an electrode array 50 and an electrolyte solution (not shown). As the electrolyte solution, the electrolyte solution according to the present embodiment is used. More specifically, battery 100 includes at least the electrolyte solution according to the present embodiment. The electrolyte solution according to the present embodiment is described above in detail. Battery 100 is expected to have a low battery resistance. The reason may be that the electrolyte solution according to the present embodiment may have a high electrical conductivity.

Battery 100 may include a gelled electrolyte. In other words, battery 100 may be a so-called lithium-ion polymer battery. The gelled electrolyte may be obtained by having the electrolyte solution permeate into a polymer material and thereby making the polymer material swollen. In the configuration in which the electrolyte solution according to the present embodiment is used as the electrolyte solution in the gelled electrolyte, a decreased battery resistance is expected to be obtained. The polymer material contained in the gelled electrolyte may be polyvinylidene difluoride (PVdF) and/or vinylidene fluoride-hexafluoropropene copolymer (PVdF-HFP), for example.

Electrode array 50 is a stack-type one. Electrode array 50 is formed by alternately stacking one positive electrode 10 and one negative electrode 20 and then repeating this alternate stacking process more than once. In each space between positive electrode 10 and negative electrode 20 in electrode array 50, a separator 30 is interposed. Each positive electrode 10 is electrically connected to positive electrode tab 81. Each negative electrode 20 is electrically connected to negative electrode tab 82.

Electrode array 50 may be a wound-type one. More specifically, electrode array 50 may be formed by stacking positive electrode 10, separator 30, and negative electrode 20 in this order and then winding them in a spiral fashion.

<<Positive Electrode>>

Positive electrode 10 may be in sheet form, for example. Positive electrode 10 includes at least a positive electrode active material. Positive electrode 10 may further include a positive electrode current collector, a conductive material, and a binder, for example. Positive electrode 10 may be formed by, for example, applying a positive electrode composite material containing the positive electrode active material, the conductive material, and the binder to a surface of the positive electrode current collector. The positive electrode current collector may be an Al foil sheet, for example. The positive electrode current collector may have a thickness not smaller than 5 μm and not greater than 50 μm, for example.

Typically, the positive electrode active material is a group of particles. The positive electrode active material may have a d50 not lower than 1 μm and not higher than 30 μm, for example. The d50 refers to the particle size in particle size distribution obtained by laser diffraction and scattering at which the cumulative particle volume (accumulated from the side of small sizes) reaches 50% of the total particle volume.

The positive electrode active material occludes and releases Li ions. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$), lithium nickel cobalt aluminate (such as $LiNi_{0.82}Co_{0.15}Al_{0.03}O_2$), and/or lithium iron phosphate ($LiFePO_4$), for example. Positive electrode 10 may include only one type of the positive electrode active material. Positive electrode 10 may include two or more types of the positive electrode active material.

The conductive material is electronically conductive. The conductive material is not particularly limited. The conductive material may be carbon black (such as acetylene black) and/or carbon short fibers, for example. The content of the conductive material may be, for example, not lower than 0.1 part by mass and not higher than 10 parts by mass relative to 100 parts by mass of the positive electrode active material.

The binder binds particles of the positive electrode active material to each other. The binder binds the positive electrode active material and the positive electrode current collector to each other. The binder is not particularly limited. The binder may be PVdF, for example. The content of the binder may be, for example, not lower than 0.1 part by mass and not higher than 10 parts by mass relative to 100 parts by mass of the positive electrode active material.

<<Negative Electrode>>

Negative electrode 20 may be in sheet form, for example. Negative electrode 20 includes at least a negative electrode active material. Negative electrode 20 may further include a negative electrode current collector and a binder, for example. Negative electrode 20 may be formed by, for example, applying a negative electrode composite material containing the negative electrode active material and the binder to a surface of the negative electrode current collector. The negative electrode current collector may be made of a copper (Cu) foil sheet, for example. The negative electrode current collector may have a thickness not smaller than 5 μm and not greater than 50 μm, for example.

Typically, the negative electrode active material is a group of particles. The negative electrode active material may have a d50 not lower than 1 μm and not higher than 30 μm, for example. The negative electrode active material occludes and releases Li ions. The negative electrode active material is not particularly limited. The negative electrode active material may be graphite (such as amorphous-carbon-coated graphite), soft carbon, hard carbon, silicon, silicon oxide, silicon-based alloy, tin, tin oxide, tin-based alloy, lithium (pure metal), lithium alloy (such as Li—Al alloy), and/or lithium titanate oxide, for example. Negative electrode 20 may include only one type of the negative electrode active material. Negative electrode 20 may include two or more types of the negative electrode active material.

The binder binds particles of the negative electrode active material to each other. The binder binds the negative electrode active material and the negative electrode current collector to each other. The binder is not particularly limited. The binder may be carboxymethylcellulose (CMC) and/or styrene-butadiene rubber (SBR), for example. The content of the binder may be, for example, not lower than 0.1 part by mass and not higher than 10 parts by mass relative to 100 parts by mass of the negative electrode active material.

<<Separator>>

Separator 30 is electrically insulating. Separator 30 is interposed between positive electrode 10 and negative electrode 20. Separator 30 separates positive electrode 10 and negative electrode 20 from each other. Separator 30 is a porous film. Separator 30 allows the electrolyte solution to pass therethrough. Separator 30 may have a thickness not smaller than 10 μm and not greater than 30 μm, for example. Separator 30 may be a porous polyolefin film, for example.

Separator 30 may have a monolayer structure. Separator 30 may consist of a porous polyethylene (PE) film, for example. Separator 30 may have a multilayer structure. Separator 30 may be formed by, for example, stacking a porous polypropylene (PP) film, a porous PE film, and a porous PP film in this order. Separator 30 may have a heat-resistant film on a surface thereof. The heat-resistant film contains a heat-resistant material. The heat-resistant material may be boehmite, silica, and/or titania, for example.

EXAMPLES

Next, examples according to the present disclosure are described. The description below does not limit the scope of claims.

<Preparation and Evaluation of Electrolyte Solution>

<<1. Preparation of Electrolyte Solution>>

Each solvent specified in Tables 1 to 4 below was prepared.

<<2. Dissolution Test>>

A test was carried out to check whether each Li salt specified in Tables 1 to 4 below was soluble in the solvent. The test procedure is as follows.

First, the Li salt (crystalline powder) was added to the solvent by a small amount at a time carefully so as not to cause agglomeration. After every addition, the resulting mixture was shaken by hand to stir the solvent. After completion of the addition of the entire amount of the Li salt as specified in Tables 1 to 4 below, the resulting mixture was shaken by hand to stir the solvent thoroughly. Thus, an electrolyte solution was prepared. The resulting electrolyte solution was left still standing in an environment at 60° C. for 30 minutes. After the 30-minute still standing, the resulting mixture was shaken by hand to stir the electrolyte solution. After stirring, the electrolyte solution was left still standing in an environment at 25° C. for three hours. After the three-hour still standing, visual observation was carried out to check for any Li salt crystals (insoluble matter) in the electrolyte solution.

The check results are shown in column "Dissolution" in Tables 1 to 4 below. In column "Dissolution", "P (positive)" means that substantially the entire amount of the Li salt dissolved and "N (negative)" means that Li salt crystals (insoluble matter) were visible in the electrolyte solution.

<<3. Measurement of Electrical Conductivity>>

In an environment in which the dew point is not higher than −30° C., the electrolyte solution and a test terminal were placed in a sample bottle. In that environment, the sample bottle was hermetically sealed. Then in an environment at 25° C., the electrical conductivity of the electrolyte solution was measured with a conductivity meter (trade name, CM-31P) manufactured by DKK-TOA Corporation. The test subject in this electrical conductivity measurement was the electrolyte solution in which substantially the entire amount of the Li salt dissolved in the dissolution test. Results are shown in column "Electrical conductivity" in Tables 1 to 4 below.

By filtrating an electrolyte solution containing insoluble matter (Li salt) and thereby removing the insoluble matter, an electrolyte solution containing the Li salt at a saturation concentration may be prepared.

<<4. Results>>

<4-1. Results of Nos. 1 to 13>

Electrolyte solution No. 1 is a conventional electrolyte solution. It is assumed that No. 1 has an optimized composition of the solvent and an optimized concentration of the Li salt. The electrical conductivity of No. 1 is 10.9 mS/cm.

No. 2 has the same composition of the solvent as that of No. 1. In No. 2, the Li salt is LiFSI. No. 2 has a slightly high electrical conductivity compared to No. 1.

In Nos. 3 to 8, the solvent contains acetic anhydride. Nos. 3 to 8 have high electrical conductivities compared to Nos. 1 and 2. In Nos. 3 to 6, the solvent contains acetic anhydride at a concentration of 80 vol %. The electrical conductivities of Nos. 3 to 6 are higher than those of Nos. 7 and 8 (60 vol %).

As understood from the results of Nos. 14 to 16 below (in Table 2 below), the saturation concentration of $LiPF_6$ in acetic anhydride serving as sole solvent may be about 0.8 mol/L. And as understood from the results of Nos. 3 to 6, the saturation concentration of $LiPF_6$ is increased by the addition of EC to acetic anhydride. However, according to the comparison between No. 3 and No. 15, for example, the increase in the saturation concentration of the Li salt may not lead to a substantial improvement in electrical conductivity. The reason may be that the improvement in electrical conductivity attributable to the increase in the saturation concentration of the Li salt has been cancelled by the decrease in electrical conductivity attributable to the decrease in the acetic anhydride ratio.

In Nos. 9 to 13, the solvent contains acetic anhydride. Nos. 9 to 13 have high electrical conductivities compared to Nos. 1 and 2. In Nos. 9 to 11, the solvent contains acetic anhydride at a concentration of 80 vol %. The electrical conductivities of Nos. 9 to 11 are higher than those of Nos. 12 and 13 (60 vol %).

As understood from the results of Nos. 9 to 11, the saturation concentration of $LiPF_6$ is increased by the DMC addition to acetic anhydride. However, according to the comparison between No. 10 and No. 16, for example, electrical conductivity may be rather decreased by the addition. The reason may be as follows; the extent of improvement in the saturation concentration attributable to the DMC addition is slightly smaller than the extent of improvement in the saturation concentration attributable to the EC addition; therefore in Nos. 9 to 11, the extent of the decrease in electrical conductivity attributable to the

TABLE 1

Evaluation (I) of electrolyte solution

| | Electrolyte solution | | | | | | | | | |
|---|---|---|---|---|---|---|---|---|---|---|
| | Solvent | | | | Li salt | | | | | |
| No. | Acetic anhydride [vol %] | EC [vol %] | DMC [vol %] | EMC [vol %] | LiFSI (A) [mol/L] | $LiPF_6$ (B) [mol/L] | A:B | Total concentration | Dissolution | Electrical conductivity [mS/cm] |
| 1 | 0 | 30 | 40 | 30 | 0 | 1.1 | 0:10 | 1.1 | P | 10.9 |
| 2 | 0 | 30 | 40 | 30 | 1.1 | 0 | 10:0 | 0 | P | 11.8 |
| 3 | 80 | 20 | 0 | 0 | 0 | 0.7 | 0:10 | 0.7 | P | 14.9 |
| 4 | 80 | 20 | 0 | 0 | 0 | 1.1 | 0:10 | 1.1 | P | 17.2 |
| 5 | 80 | 20 | 0 | 0 | 0 | 1.3 | 0:10 | 1.3 | P | 17.3 |
| 6 | 80 | 20 | 0 | 0 | 0 | 1.5 | 0:10 | 1.5 | N | — |
| 7 | 60 | 40 | 0 | 0 | 0 | 0.7 | 0:10 | 0.7 | P | 13.0 |
| 8 | 60 | 40 | 0 | 0 | 0 | 1.1 | 0:10 | 1.1 | P | 14.6 |
| 9 | 80 | 0 | 20 | 0 | 0 | 0.7 | 0:10 | 0.7 | P | 14.8 |
| 10 | 80 | 0 | 20 | 0 | 0 | 0.9 | 0:10 | 0.9 | P | 16.9 |
| 11 | 80 | 0 | 20 | 0 | 0 | 1.0 | 0:10 | 1.0 | N | — |
| 12 | 60 | 0 | 40 | 0 | 0 | 0.7 | 0:10 | 0.7 | P | 13.0 |
| 13 | 60 | 0 | 40 | 0 | 0 | 1.1 | 0:10 | 1.1 | P | 16.2 | decreased acetic anhydride ratio is greater than the extent of improvement in electrical conductivity attributable to the increased saturation concentration of the Li salt.

As understood from the above results, acetic anhydride may have an excellently-balanced combination of dissociative capacity and viscosity compared to EC and, in addition, acetic anhydride may also have an excellently-balanced combination of dissociative capacity and viscosity compared to DMC.

<4-2. Results of Nos. 14 to 37>

Results of Nos. 25 to 37 show the following tendency: when the Li salt contains both LiFSI and $LiPF_6$, the higher the LiFSI ratio is, the higher the saturation concentration of the entire Li salt is.

Results of Nos. 25 to 37 show the following tendency: when the Li salt contains both LiFSI and $LiPF_6$ and when the ratio (in concentration) of LiFSI to $LiPF_6$ satisfies the relationship "LiFSI:$LiPF_6$ (A:B)=10:0 to 2:8", electrical conductivity is improved.

TABLE 2

Evaluation (II) of electrolyte solution

| | Electrolyte solution | | | | | | | | |
|---|---|---|---|---|---|---|---|---|---|
| | Solvent | | | | Li salt | | | | |
| No. | Acetic anhydride [vol %] | EC [vol %] | DMC [vol %] | EMC [vol %] | LiFSI (A) [mol/L] | $LiPF_6$ (B) [mol/L] | A:B | Total concentration | Dissolution | Electrical conductivity [mS/cm] |
| 14 | 100 | 0 | 0 | 0 | 0 | 0.5 | 0:10 | 0.5 | P | 13.5 |
| 15 | 100 | 0 | 0 | 0 | 0 | 0.7 | 0:10 | 0.7 | P | 16.3 |
| 16 | 100 | 0 | 0 | 0 | 0 | 0.8 | 0:10 | 0.8 | P | 17.3 |
| 17 | 100 | 0 | 0 | 0 | 0 | 0.9 | 0:10 | 0.9 | N | — |
| 18 | 100 | 0 | 0 | 0 | 0 | 1.1 | 0:10 | 1.1 | N | — |
| 19 | 100 | 0 | 0 | 0 | 0.7 | 0 | 10:0 | 0.7 | P | 16.3 |
| 20 | 100 | 0 | 0 | 0 | 1.1 | 0 | 10:0 | 1.1 | P | 19.5 |
| 21 | 100 | 0 | 0 | 0 | 1.5 | 0 | 10:0 | 1.5 | P | 20.0 |
| 22 | 100 | 0 | 0 | 0 | 2.0 | 0 | 10:0 | 2.0 | P | 19.5 |
| 23 | 100 | 0 | 0 | 0 | 2.5 | 0 | 10:0 | 2.5 | P | 17.2 |
| 24 | 100 | 0 | 0 | 0 | 3.0 | 0 | 10:0 | 3.0 | N | — |
| 25 | 100 | 0 | 0 | 0 | 0.08 | 0.72 | 1:9 | 0.8 | P | 17.4 |
| 26 | 100 | 0 | 0 | 0 | 0.1 | 0.9 | 1:9 | 1.0 | N | — |
| 27 | 100 | 0 | 0 | 0 | 0.18 | 0.72 | 2:8 | 0.9 | P | 18.1 |
| 28 | 100 | 0 | 0 | 0 | 0.2 | 0.8 | 2:8 | 1.0 | N | — |
| 29 | 100 | 0 | 0 | 0 | 0.22 | 0.88 | 2:8 | 1.1 | N | — |
| 30 | 100 | 0 | 0 | 0 | 0.3 | 0.7 | 3:7 | 1.0 | P | 18.8 |
| 31 | 100 | 0 | 0 | 0 | 0.33 | 0.77 | 3:7 | 1.1 | N | — |
| 32 | 100 | 0 | 0 | 0 | 0.44 | 0.66 | 4:6 | 1.1 | P | 18.8 |
| 33 | 100 | 0 | 0 | 0 | 0.52 | 0.78 | 4:6 | 1.3 | N | — |
| 34 | 100 | 0 | 0 | 0 | 0.55 | 0.55 | 5:5 | 1.1 | P | 19.5 |
| 35 | 100 | 0 | 0 | 0 | 0.65 | 0.65 | 5:5 | 1.3 | P | 19.8 |
| 36 | 100 | 0 | 0 | 0 | 0.75 | 0.75 | 5:5 | 1.5 | N | — |
| 37 | 100 | 0 | 0 | 0 | 0.9 | 0.6 | 6:4 | 1.5 | P | 19.9 |

As understood from the results of Nos. 14 to 18, the saturation concentration of $LiPF_6$ in acetic anhydride may be about 0.8 mol/L. The higher the concentration of $LiPF_6$ is as long as it is not higher than the saturation concentration, namely, as long as it ranges from 0.5 to 0.8 mol/L, the higher the electrical conductivity is. If the Li salt is soluble at a concentration higher than 0.8 mol/L, electrical conductivity would be further improved.

As understood from the results of Nos. 19 to 24, the saturation concentration of LiFSI in acetic anhydride may be about 2.5 mol/L. When the concentration of LiFSI is 1.5 mol/L, the electrical conductivity reaches its maximum. The electrical conductivity being at its maximum may indicate that the electrical-conductivity-improving effect of acetic anhydride is sufficiently exhibited.

These results show another tendency that when the ratio (in concentration) of LiFSI to $LiPF_6$ satisfies the relationship "LiFSI:$LiPF_6$ (A:B)=10:0 to 5:5", electrical conductivity is further improved.

Figure 3:
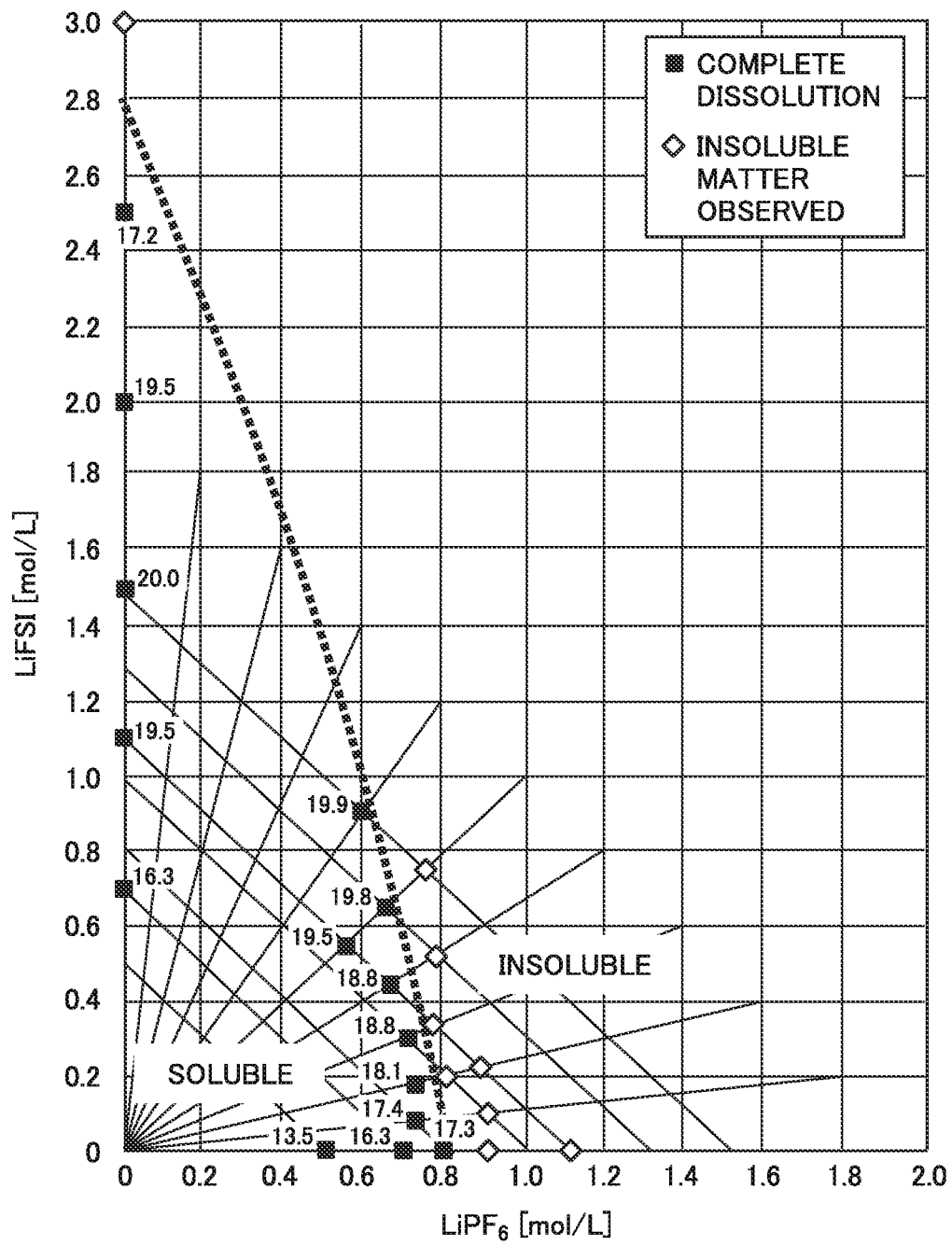
FIG. 3 is a scatter diagram showing the solubility of a Li salt in a single-component system consisting of acetic anhydride.

FIG. 3 is a scatter diagram showing the solubility of a Li salt in a single-component system consisting of acetic anhydride.

The dotted line in FIG. 3 is an estimated boundary separating the soluble state, in which substantially the entire amount of the Li salt is dissolved, and the insoluble state, in which insoluble matter (Li salt) is visible. This dotted line may also serve as a saturation concentration curve. The numerals on the dots show the values of electrical conductivity. The same applies to FIGS. 4 to 7 below.

<4-3. Results of Nos. 38 to 54>

TABLE 3

Evaluation (III) of electrolyte solution

| | Electrolyte solution | | | | | | | | | |
|---|---|---|---|---|---|---|---|---|---|---|
| | Solvent | | | | Li salt | | | | | |
| No. | Acetic anhydride [vol %] | EC [vol %] | DMC [vol %] | EMC [vol %] | LiFSI (A) [mol/L] | LiPF$_6$ (B) [mol/L] | A:B | Total concentration | Dissolution | Electrical conductivity [mS/cm] |
| 38 | 90 | 10 | 0 | 0 | 0 | 1.3 | 0:10 | 1.3 | N | — |
| 39 | 90 | 10 | 0 | 0 | 0.13 | 1.17 | 1:9 | 1.3 | N | — |
| 40 | 90 | 10 | 0 | 0 | 0.15 | 1.35 | 1:9 | 1.5 | N | — |
| 41 | 90 | 10 | 0 | 0 | 0.26 | 1.04 | 2:8 | 1.3 | P | 18.6 |
| 42 | 90 | 10 | 0 | 0 | 0.3 | 1.2 | 2:8 | 1.5 | N | — |
| 43 | 90 | 10 | 0 | 0 | 0.45 | 1.05 | 3:7 | 1.5 | N | — |
| 44 | 90 | 10 | 0 | 0 | 0.6 | 0.9 | 4:6 | 1.5 | P | 18.7 |
| 45 | 90 | 10 | 0 | 0 | 0.55 | 0.55 | 5:5 | 1.1 | P | 18.6 |
| 46 | 90 | 10 | 0 | 0 | 0.75 | 0.75 | 5:5 | 1.5 | P | 18.8 |
| 47 | 90 | 10 | 0 | 0 | 1.0 | 1.0 | 5:5 | 2.0 | N | — |
| 48 | 90 | 10 | 0 | 0 | 1.1 | 0 | 10:0 | 1.1 | P | 18.6 |
| 27 | 80 | 20 | 0 | 0 | 0 | 1.1 | 0:10 | 1.1 | P | 17.2 |
| 30 | 80 | 20 | 0 | 0 | 0 | 1.3 | 0:10 | 1.3 | P | 17.3 |
| 6 | 80 | 20 | 0 | 0 | 0 | 1.5 | 0:10 | 1.5 | N | — |
| 49 | 80 | 20 | 0 | 0 | 0.13 | 1.17 | 1:9 | 1.3 | P | 17.4 |
| 50 | 80 | 20 | 0 | 0 | 0.15 | 1.35 | 1:9 | 1.5 | N | — |
| 51 | 80 | 20 | 0 | 0 | 0.55 | 0.55 | 5:5 | 1.1 | P | 17.4 |
| 52 | 80 | 20 | 0 | 0 | 0.75 | 0.75 | 5:5 | 1.5 | P | 17.5 |
| 53 | 80 | 20 | 0 | 0 | 1.0 | 1.0 | 5:5 | 2.0 | P | 16.0 |
| 54 | 80 | 20 | 0 | 0 | 1.1 | 0 | 10:0 | 1.1 | P | 17.5 |

Results of Nos. 38 to 48 show the following tendency of a two-component system consisting of acetic anhydride and EC: when the concentration of acetic anhydride is 90 vol % and when the ratio (in concentration) of LiFSI to LiPF$_6$ satisfies the relationship "LiFSI:LiPF$_6$ (A:B)=10:0 to 2:8", the saturation concentration of the entire Li salt is increased and the electrical conductivity is improved.

Results of Nos. 49 to 54, 27, 30, and 6 show the following tendency of a two-component system consisting of acetic anhydride and EC: when the concentration of acetic anhydride is 80 vol % and when the ratio (in concentration) of LiFSI to LiPF$_6$ satisfies the relationship "LiFSI:LiPF$_6$ (A:B)=10:0 to 2:8", the saturation concentration of the entire Li salt is increased with a small improvement in electrical conductivity.

Figure 4:
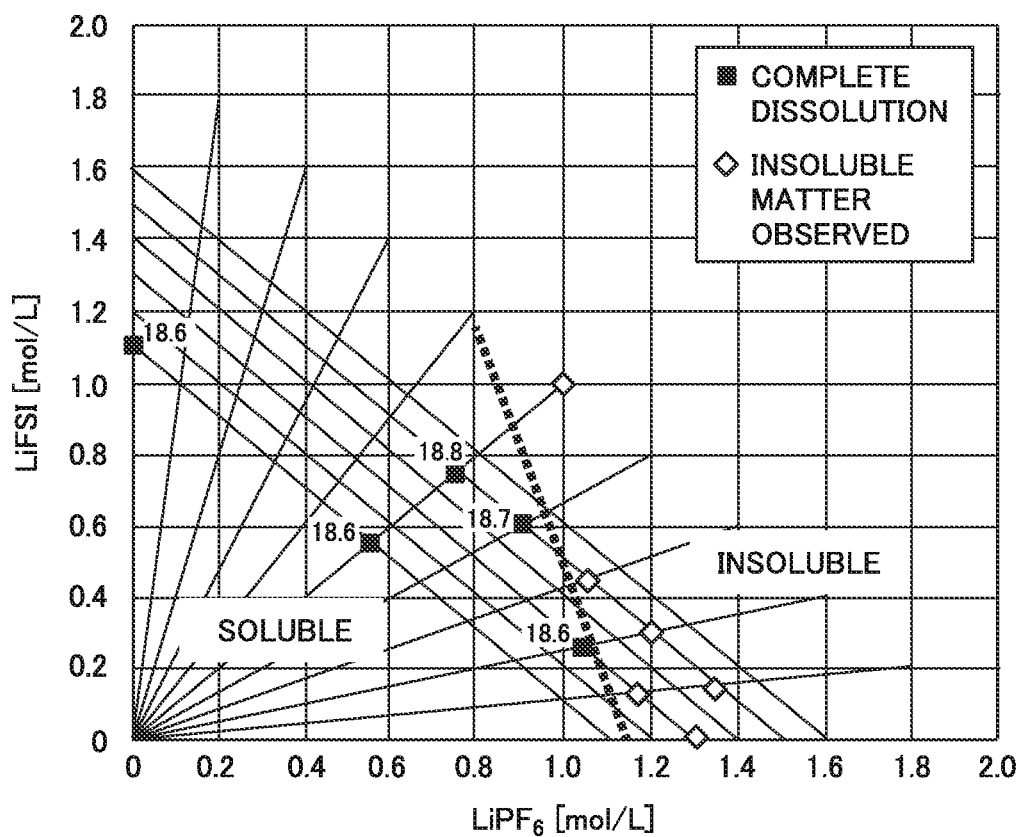
FIG. 4 is a scatter diagram showing the solubility of a Li salt in a two-component system consisting of acetic anhydride (90 vol %) and EC (10 vol %).
Figure 5:
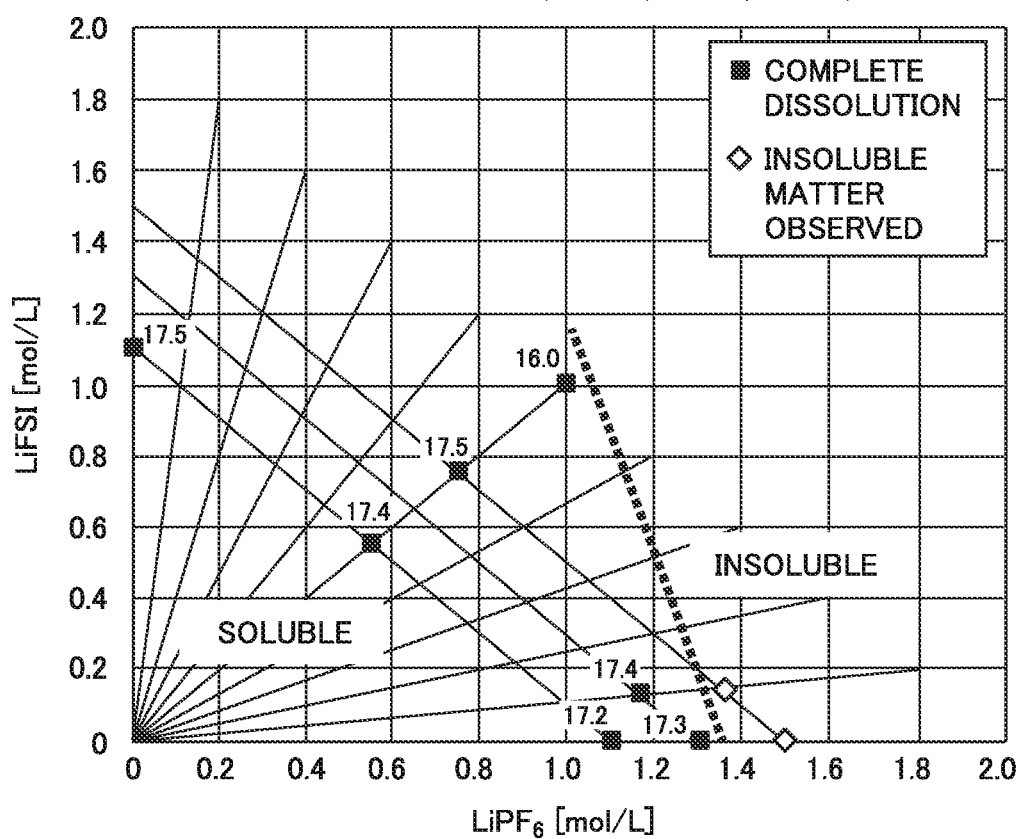
FIG. 5 is a scatter diagram showing the solubility of a Li salt in a two-component system consisting of acetic anhydride (80 vol %) and EC (20 vol %).

FIG. 4 is a scatter diagram showing the solubility of a Li salt in a two-component system consisting of acetic anhydride (90 vol %) and EC (10 vol %). FIG. 5 is a scatter diagram showing the solubility of a Li salt in a two-component system consisting of acetic anhydride (80 vol %) and EC (20 vol %). FIGS. 4 and 5 show the following tendency of a two-component system consisting of acetic anhydride and EC: an increase in the EC ratio leads to an increase of the area occupied by the soluble state, with no substantial improvement in electrical conductivity.

<4-4. Results of Nos. 55 to 73>

TABLE 4

Evaluation (IV) of electrolyte solution

| | Electrolyte solution | | | | | | | | | |
|---|---|---|---|---|---|---|---|---|---|---|
| | Solvent | | | | Li salt | | | | | |
| No. | Acetic anhydride [vol %] | EC [vol %] | DMC [vol %] | EMC [vol %] | LiFSI (A) [mol/L] | LiPF$_6$ (B) [mol/L] | A:B | Total concentration | Dissolution | Electrical conductivity [mS/cm] |
| 55 | 90 | 0 | 10 | 0 | 0 | 0.8 | 0:10 | 0.8 | P | 17.4 |
| 56 | 90 | 0 | 10 | 0 | 0 | 0.9 | 0:10 | 0.9 | N | — |
| 57 | 90 | 0 | 10 | 0 | 0 | 1.1 | 0:10 | 1.1 | N | — |
| 58 | 90 | 0 | 10 | 0 | 0.09 | 0.81 | 1:9 | 0.9 | P | 17.7 |
| 59 | 90 | 0 | 10 | 0 | 0.1 | 0.9 | 1:9 | 1.0 | N | — |
| 60 | 90 | 0 | 10 | 0 | 0.2 | 0.8 | 2:8 | 1.0 | P | 18.2 |
| 61 | 90 | 0 | 10 | 0 | 0.22 | 0.88 | 2:8 | 1.1 | N | — |
| 62 | 90 | 0 | 10 | 0 | 0.33 | 0.77 | 3:7 | 1.1 | P | 18.4 |
| 63 | 90 | 0 | 10 | 0 | 0.52 | 0.78 | 4:6 | 1.3 | N | — |
| 64 | 90 | 0 | 10 | 0 | 0.55 | 0.55 | 5:5 | 1.1 | P | 18.6 |
| 65 | 90 | 0 | 10 | 0 | 1.1 | 0 | 10:0 | 1.1 | P | 19.1 |
| 66 | 80 | 0 | 20 | 0 | 0 | 0.9 | 0:10 | 0.9 | P | 16.9 |
| 67 | 80 | 0 | 20 | 0 | 1.0 | 0 | 0:10 | 1.0 | N | — |
| 68 | 80 | 0 | 20 | 0 | 0 | 1.1 | 0:10 | 1.1 | N | — |
| 69 | 80 | 0 | 20 | 0 | 0.11 | 0.99 | 1:9 | 1.1 | N | — |
| 70 | 80 | 0 | 20 | 0 | 0.55 | 0.55 | 5:5 | 1.1 | P | 18.2 |

TABLE 4-continued

Evaluation (IV) of electrolyte solution

| | Electrolyte solution | | | | | | | | |
|---|---|---|---|---|---|---|---|---|---|
| | Solvent | | | | Li salt | | | | |
| No. | Acetic anhydride [vol %] | EC [vol %] | DMC [vol %] | EMC [vol %] | LiFSI (A) [mol/L] | LiPF$_6$ (B) [mol/L] | A:B | Total concentration | Dissolution | Electrical conductivity [mS/cm] |
| 71 | 80 | 0 | 20 | 0 | 0.65 | 0.65 | 5:5 | 1.3 | P | 19.1 |
| 72 | 80 | 0 | 20 | 0 | 0.75 | 0.75 | 5:5 | 1.5 | N | — |
| 73 | 80 | 0 | 20 | 0 | 1.1 | 0 | 10:0 | 1.1 | P | 18.4 |

Results of Nos. 55 to 65 show the following tendency of a two-component system consisting of acetic anhydride and DMC: when the concentration of acetic anhydride is 90 vol % and when the ratio (in concentration) of LiFSI to LiPF$_6$ satisfies the relationship "LiFSI:LiPF$_6$ (A:B)=10:0 to 2:8", the saturation concentration of the entire Li salt is increased and the electrical conductivity is improved.

Results of Nos. 66 to 73 show the following tendency of a two-component system consisting of acetic anhydride and DMC: when the concentration of acetic anhydride is 80 vol % and when the ratio (in concentration) of LiFSI to LiPF$_6$ satisfies the relationship "LiFSI:LiPF$_6$ (A:B)=10:0 to 2:8", the saturation concentration of the entire Li salt is increased with a small improvement in electrical conductivity.

Figure 6:
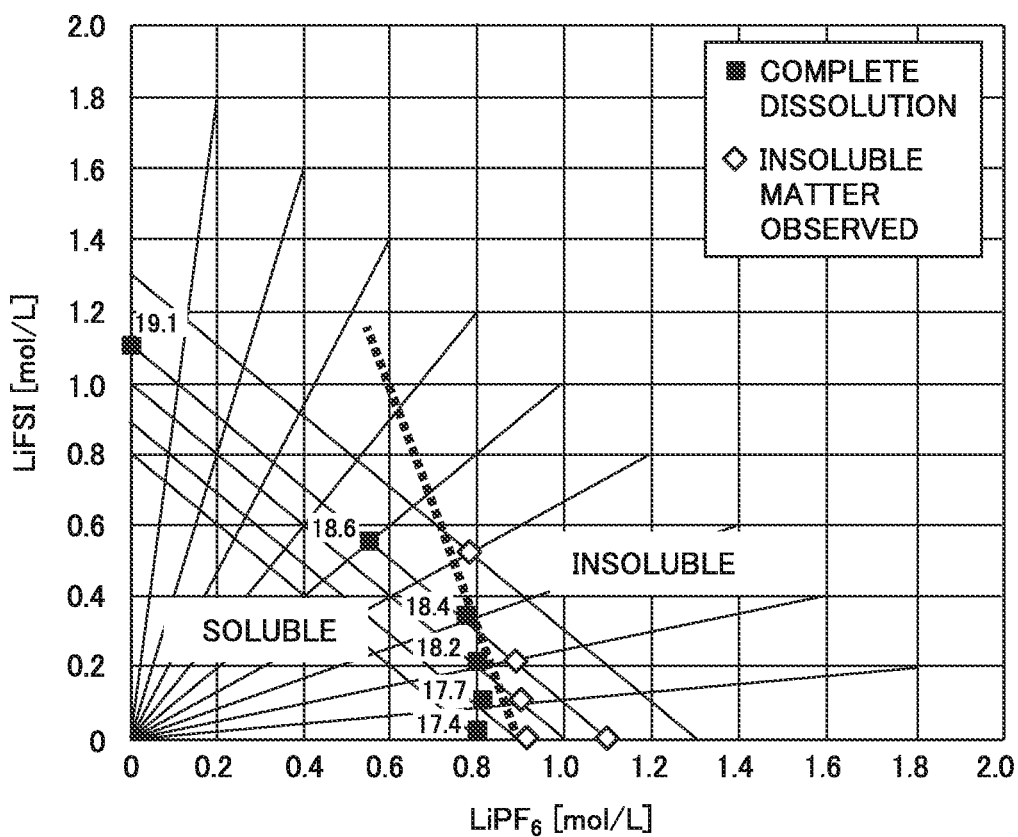
FIG. 6 is a scatter diagram showing the solubility of a Li salt in a two-component system consisting of acetic anhydride (90 vol %) and DMC (10 vol %).
Figure 7:
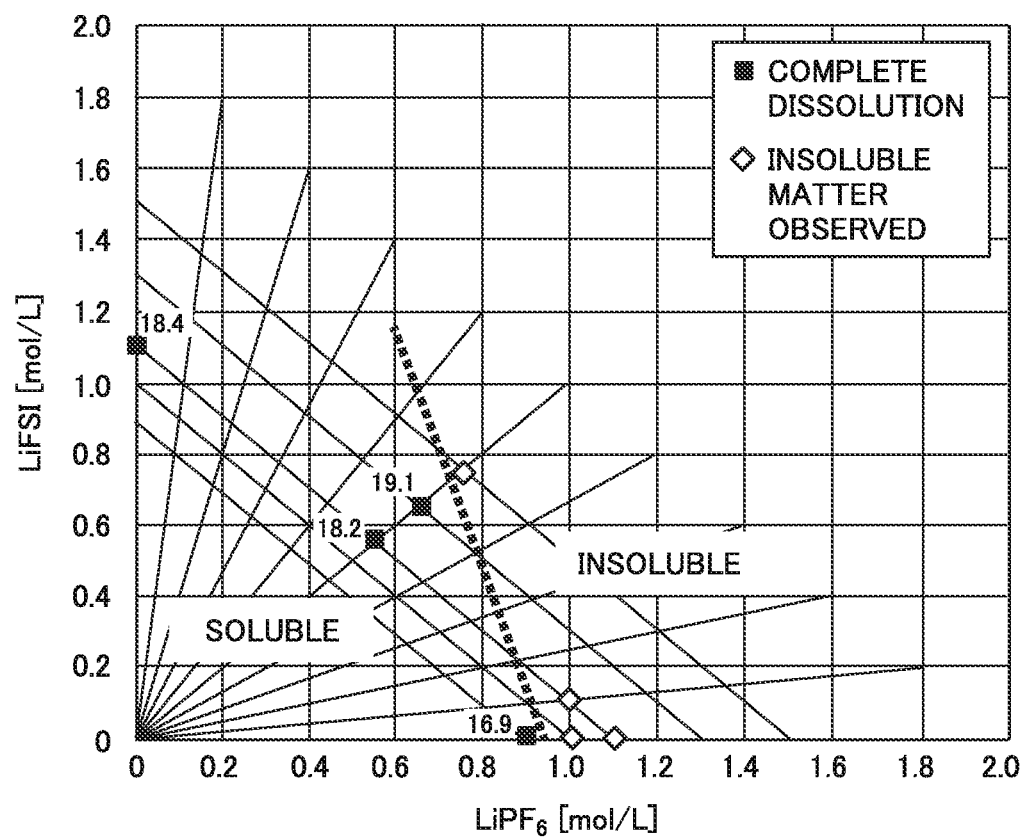
FIG. 7 is a scatter diagram showing the solubility of a Li salt in a two-component system consisting of acetic anhydride (80 vol %) and DMC (20 vol %).

FIG. 6 is a scatter diagram showing the solubility of a Li salt in a two-component system consisting of acetic anhydride (90 vol %) and DMC (10 vol %). FIG. 7 is a scatter diagram showing the solubility of a Li salt in a two-component system consisting of acetic anhydride (80 vol %) and DMC (20 vol %). FIGS. 6 and 7 show that in a two-component system consisting of acetic anhydride and DMC, an increase in the DMC ratio leads to improvement in electrical conductivity with a small increase of the area occupied by the soluble state. The difference in the outcome between this system and a two-component system consisting of acetic anhydride and EC (FIGS. 4 and 5) may be attributable to the viscosity of DMC. More specifically, the viscosity of DMC is lower that that of EC and therefore the increase in the concentration of the Li salt may lead to an improved electrical conductivity.

<4-5. Evaluation of Battery>

Batteries 100 including electrolyte solutions Nos. 1, 2, 15, and 21, respectively, were produced. The battery configuration without including the electrolyte solution is as follows. The resistance of each battery 100 was measured with a milliohm meter "Agilent 4338B" manufactured by Agilent Technologies. Results are shown in Table 5 below.

Design capacity: 28 mAh

Casing: pouch made of aluminum-laminated film

Positive electrode active material: lithium nickel cobalt manganese oxide (19.0 mg/cm$^2$)

Negative electrode active material: amorphous-carbon-coated graphite (9.2 mg/cm$^2$)

Separator: porous PE film (which has a heat-resistant film formed on a surface thereof)

TABLE 5

Evaluation of battery

| | Electrolyte solution | | | | | | | |
|---|---|---|---|---|---|---|---|---|
| | Solvent | | | | Li salt | | | |
| No. | Acetic anhydride [vol %] | EC [vol %] | DMC [vol %] | EMC [vol %] | LiFSI (A) [mol/L] | LiPF$_6$ (B) [mol/L] | Electrical conductivity [mS/cm] | Battery resistance [mΩ] |
| 1 | 0 | 30 | 40 | 30 | 0 | 1.1 | 10.9 | 313 |
| 2 | 0 | 30 | 40 | 30 | 1.1 | 0 | 11.8 | 307 |
| 15 | 100 | 0 | 0 | 0 | 0 | 0.7 | 16.3 | 282 |
| 21 | 100 | 0 | 0 | 0 | 1.5 | 0 | 20.0 | 255 |

As shown in Table 5 above, battery 100 including electrolyte solution No. 15 and battery 100 including electrolyte solution No. 21 have a low battery resistances. The reason may be that the electrolyte solution has a high electrical conductivity.

The embodiments and examples disclosed herein are illustrative and non-restrictive in any respect. The technical scope indicated by the claims is intended to include any modifications within the scope and meaning equivalent to the terms of the claims.

What is claimed is:

1. An electrolyte solution for a lithium-ion battery, the electrolyte solution comprising at least:

a solvent; and a lithium salt, the lithium salt being dissolved in the solvent, the solvent containing acetic anhydride at a concentration not lower than 90 vol %, the lithium salt containing lithium bis(fluorosulfonyl) imide and LiPF$_6$, wherein, the lithium salt is dissolved in the solvent at a concentration not lower than 1.1 mol/L and not higher than 1.5 mol/L, a concentration of lithium bis(fluorosulfonyl)imide is not higher than 0.75 mol/L, a concentration of $LiPF_6$ is not lower than 0.55 mol/L, a concentration of lithium bis(fluorosulfonyl)imide and a concentration of $LiPF_6$ satisfy the following relationship:

lithium bis(fluorosulfonyl)imide:$LiPF_6$=2:8 to 5:5.

2. A lithium-ion battery comprising at least the electrolyte solution according to claim 1.

3. The electrolyte solution according to claim 1, wherein the solvent further includes at least one of ethylene carbonate and dimethyl carbonate as the remainder.

4. The electrolyte solution according to claim 1, wherein the solvent consists essentially of 90 vol % or more of acetic anhydride and ethylene carbonate as the remainder.

5. The electrolyte solution according to claim 1, wherein the solvent consists essentially of 90 vol % or more of acetic anhydride and dimethyl carbonate as the remainder.

\* \* \* \* \*